(No Model.)
E. Y. MACKENZIE.
BICYCLE.
No. 570,320. Patented Oct. 27, 1896.
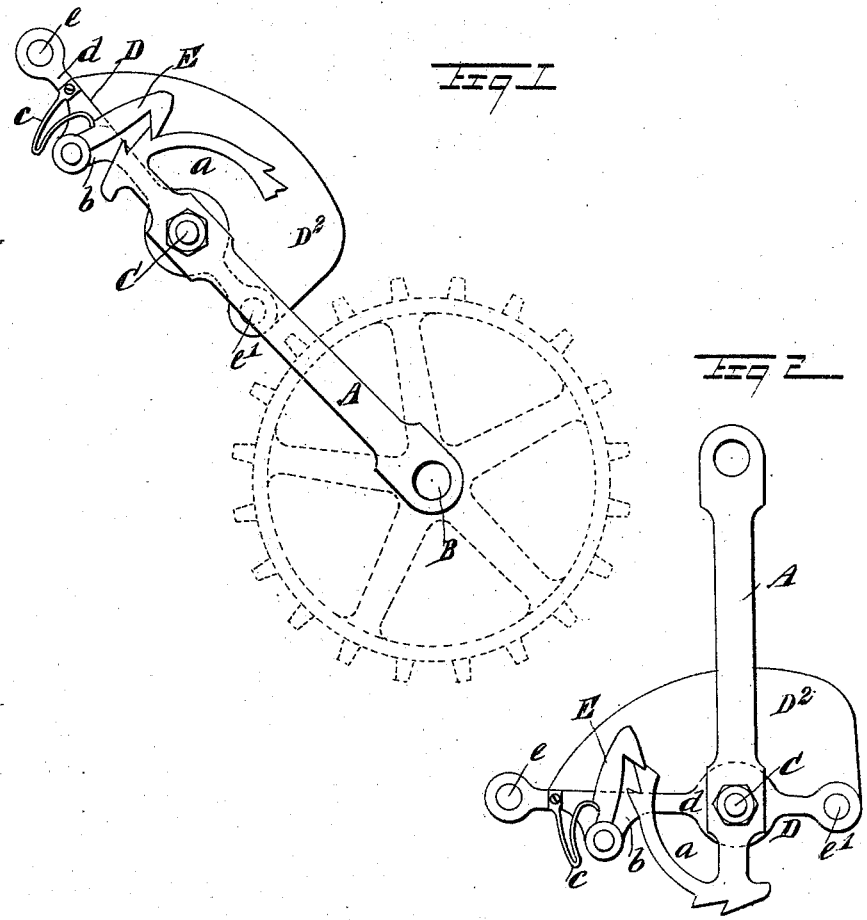
WITNESSES:
INVENTOR
E. Y. Mackenzie
BY
Munn & Co
ATTORNEYS.

UNITED STATES PATENT OFFICE.

EDWIN YARRINGTON MacKENZIE, OF KINGSTON, JAMAICA.

BICYCLE.

SPECIFICATION forming part of Letters Patent No. 570,320, dated October 27, 1896.

Application filed October 16, 1895. Serial No. 565,911. (No model.)

*To all whom it may concern:*

Be it known that I, EDWIN YARRINGTON MACKENZIE, of Kingston, Jamaica, West Indies, have invented new and useful Improvements in Bicycles, of which the following is a full, clear, and exact description.

The object of my invention is to provide an attachment to bicycles to take the place of the ordinary pedal, by means of which the leverage may be increased, so as to facilitate the propulsion of the vehicle up inclines and over rough roads and at an increased speed.

The invention will be fully described hereinafter and defined in the claim.

Reference is to be had to the accompanying drawings, forming a part of this specification, in which similar characters of reference indicate corresponding parts in both views.

Figure 1 is a side elevation of my improved crank-arm and pedal, showing the sprocket-wheel in dotted lines, the pawl of the pedal being shown in engagement with one of the teeth of the curved ratchet-bar; and Fig. 2 is a side elevation of the crank-arm and pedal, showing the engagement of the hooked pawl with the last of the teeth of the curved ratchet-bar.

The crank-arm A, which is attached in the usual way to the sprocket-wheel shaft B of a bicycle, has the usual aperture for receiving the stud C, on which turns the pedal D. The crank-arm A has attached to or formed upon it a curved ratchet-bar $a$, provided with teeth at opposite extremities, and to an ear $b$, projecting from the pedal D, is pivoted a pawl E, which is pressed into engagement with the teeth of the ratchet-bar $a$ by the spring $c$, attached to the pedal.

The pedal D is formed of a sleeve fitted to the stud C, and side bars $d$, attached to opposite ends of the sleeve, and foot-pieces $e\ e'$, engaging the ends of the bars $d$. The ends of the bars $d$ on one side of the stud C are longer than those on the opposite side of the said stud, so that while the foot-piece $e'$ is near the stud C, as on ordinary pedals, the foot-piece $e$ is placed farther away from the stud, so that the end of the pedal carrying the foot-piece $e$ forms an extension of the crank-arm when the bar $d$ is parallel with the crank-arm and the pawl E engages the outer teeth of the ratchet-bar $a$. A shield $D^2$ is attached to the frame D to prevent the foot from catching in the ratchet.

The pedal operates like an ordinary pedal during the upward movement of the crank-arm, but shortly after the crank-arm has passed the center the forward end of the pedal is raised by bending the ankle until the pawl E is brought into engagement with the outer teeth of the ratchet-bar $a$, as shown in Fig. 1. When the pedal is in this position, it practically forms an extension of the crank-arm and greatly increases the leverage of the crank-arm. When the crank-arm is moved forward as far as possible or convenient with the pedal in this position, the foot returns to its natural position, turning the pedal on its stud and bringing the pawl E into engagement with the teeth of the inner end of the curved ratchet-bar, thus bringing the pedal approximately at right angles to the crank-arm and shifting the leverage so that the foot may continue to act upon the crank long after the crank has passed the center and after the opposite crank has begun to act. By means of this double action of the pedal a great increase in the length of the arc through which the crank may act is secured. When the extra leverage and prolonged action, either or both, are not required, the pawl does not engage the teeth and the pedal acts like an ordinary pedal.

Having thus described my invention, I claim as new and desire to secure by Letters Patent—

The combination of a crank-arm, a pedal-shaft secured between the ends of the crank-arm, said ends of the crank-arm extending on opposite sides of the pedal-shaft, a pedal eccentrically pivoted on the pedal-shaft, a ratchet-bar secured to and extending from the outer end of the crank-arm beyond the pedal-shaft and having at each end teeth, and between the said teeth a central plain portion, and a spring-pawl pivoted on the longer end of the pedal and normally held in engagement with said teeth on the ratchet-bar, substantially as set forth.

EDWIN YARRINGTON MacKENZIE.

Witnesses:
A. MOODIE,
E. BOLIVAR WILLIAMS.